United States Patent [19]
Yamakoshi

[11] Patent Number: 5,246,277
[45] Date of Patent: Sep. 21, 1993

[54] LIQUID PRESSURE CONTROL DEVICE FOR LOAD RESPONDING BRAKE

[75] Inventor: Mutsuro Yamakoshi, Higashimatsuyama, Japan

[73] Assignee: Jidosha Kiki Co., Ltd., Tokyo, Japan

[21] Appl. No.: 863,238

[22] Filed: Apr. 3, 1992

[30] Foreign Application Priority Data

May 7, 1991 [JP] Japan ................ 3-41277[U]

[51] Int. Cl.⁵ .............................................. B60T 8/30
[52] U.S. Cl. .................................. 303/9.69; 303/22.8; 303/9.75
[58] Field of Search ........... 303/9.69, 9.72–9.75, 303/22.1, 22.2, 22.7, 22.8

[56] References Cited

U.S. PATENT DOCUMENTS

| | | | |
|---|---|---|---|
| 4,101,176 | 7/1978 | Carré et al. | 303/9.75 |
| 4,427,239 | 1/1984 | Reinartz et al. | 303/9.75 |
| 4,548,445 | 10/1985 | Mizusawa et al. | 303/22.4 |
| 4,623,200 | 11/1986 | Ando et al. | 303/22.8 |
| 4,624,507 | 11/1987 | Carre et al. | 303/9.69 |
| 4,750,786 | 6/1988 | Adachi et al. | 303/22.1 |
| 4,925,251 | 5/1990 | Picot et al. | 303/22.1 |

FOREIGN PATENT DOCUMENTS

| | | | |
|---|---|---|---|
| 86134 | 8/1983 | European Pat. Off. | 303/9.69 |
| 444281 | 9/1991 | European Pat. Off. | 303/9.69 |
| 2600813 | 7/1976 | Fed. Rep. of Germany | 303/9.69 |
| 2713013 | 10/1977 | Fed. Rep. of Germany | 303/9.69 |
| 66058 | 4/1982 | Japan | 303/9.69 |
| 66059 | 4/1982 | Japan | 303/9.69 |
| 63-148567 | 6/1988 | Japan . | |
| 1444397 | 7/1976 | United Kingdom | 303/9.69 |
| 2056002 | 3/1981 | United Kingdom . | |
| 2130322 | 5/1984 | United Kingdom | 303/9.69 |
| 2189304 | 10/1987 | United Kingdom . | |
| 2190160 | 11/1987 | United Kingdom | 303/9.69 |

Primary Examiner—Robert J. Oberleitner
Assistant Examiner—Alfred Muratori
Attorney, Agent, or Firm—Jacobson, Price, Holman & Stern

[57] ABSTRACT

A liquid pressure control device (1) including a valve mechanism for reducing liquid pressure of a brake master cylinder at a predetermined ratio by a pair of plungers (3, 4) moved independently by liquid pressure from the brake master cylinder through ports (7, 8) and for transmitting the reduced pressure to brake cylinders, of right and left rear wheels through ports (9, 10), respectively, and a load sensing mechanism (11) for having a load according to a movable load of a vehicle act on respective plungers (3, 4) so as to move a pressure reduction starting point of the valve mechanism. The load sensing mechanism (11) has a spring (12) connected to an axle side at one end thereof for transmitting energizing force according to the movable load of the vehicle, a load sensing lever (13) pivotally supported on a housing of the valve mechanisms (5, 6) at one end thereof and connected to the other end of the spring at the other end thereof, an equalizer (14) abutting against ends (3a, 4a) of respective plungers (3, 4), and a clamp member (15) for attaching the equalizer fixedly at a predetermined position of the load sensing lever and preventing the equalizer from coming off due to a large movement of the load sensing lever.

16 Claims, 3 Drawing Sheets

LIQUID PRESSURE CONTROL DEVICE FOR LOAD RESPONDING BRAKE

BACKGROUND OF THE INVENTION

The present invention relates to a liquid pressure control device for load responding brakes for automobiles for reducing output liquid pressure of a brake master cylinder at a predetermined ratio corresponding to a movable load and more particularly to improvement of a load sensing mechanism.

A liquid pressure control device of this type is disposed halfway in a liquid pressure passage leading to brake cylinders of rear wheels from a brake master cylinder, and applies braking force equal to that on front wheels to rear wheels at the time of low braking at the initial stage of braking and braking force smaller than that on the front wheels when the braking force reaches to a predetermined value or higher, thereby to prevent locking of the rear wheels. Further, since the magnitude of braking force produced by locking of the rear wheels is different depending on the weight of a movable load on a vehicle such as a truck, the braking force for starting to reduce the braking force to rear wheels is made larger when the movable load is large and smaller when it is small.

Namely, the liquid pressure of the brake master cylinder is reduced in the predetermined ratio and transmitted to brake cylinders of right and left rear wheels by opening and closing respective control valves by means of a pair of plungers responding independently with the liquid pressure from the brake master cylinder.

Furthermore, such an apparatus that, in order to give a characteristic according to a movable load of a vehicle to these control valves, the force according to a movable load is applied to respective plungers by means of a load sensing mechanism so as to change the pressure reducing action starting point (pressure) of the control valves, thereby to make the braking force control starting pressure of the rear wheels larger as the movable load is larger is already known. (For example, Japanese Utility Model Provisional Publication No. 63-148567 (No. 148567/1988)).

In a liquid pressure control device as described above, however, there has been such a problem that an equalizer for having force according to the movable load act on plungers of respective control valves interposes between a load sensing lever of a load sensing mechanism and above-mentioned respective plungers, action abutting points against respective plungers move against a large movement of the load detecting lever during assembly and adjustment as a device, and a plurality of parts and working thereof are also required in assembly, thus causing poor assembly workability on the whole.

BRIEF SUMMARY OF THE INVENTION

It is an object of the present invention to overcome the abovementioned problems by providing a liquid pressure control device for load responding brake in which each plunger always abuts against a fixed position of the equalizer at the time of reabuttment even if abuttment between the equalizer and each plunger is released against a large movement of a load sensing lever of a load sensing mechanism.

It is another object of the present invention to provide a liquid pressure control device for load responding brakes which uses a small number of parts and has excellent workability at the time of assembly.

The present invention achieves the above-mentioned objects by providing a liquid pressure control device for load responding brakes including a valve mechanism for reducing liquid pressure of a brake master cylinder at a predetermined ratio and transmitting the liquid pressure to brake cylinders of right and left rear wheels, respectively, by means of a pair of plungers responding independently, respectively, by the liquid pressure of the brake master cylinder and a load sensing mechanism for letting a load according to a movable load of a vehicle act on the respective plungers so as to move a pressure reducing action starting point of the valve mechanism. The above-mentioned load sensing mechanism is composed of a spring which is connected to the axle side at one end thereof and gives an energizing force according to the movable load of the vehicle, a load sensing lever which is supported at one end thereof by the housing of the valve mechanism so as to be able to oscillate and connected to the other end of the spring at the other end thereof, an equalizer abutting against one end of each plunger, and a clamp member for attaching the equalizer fixedly at a predetermined position of the load sensing lever.

Furthermore, the structure of the present invention is characterized in that guides for guiding respective plunger ends are provided on the equalizer in order to have abutting positions against one end of each plunger specified.

Since the present invention is structured as described above, the above-mentioned equalizer is attached fixedly at a predetermined position on the load sensing lever side with a small number of parts, and is able to have respective plungers which always abut at a fixed position by means of the guide.

BRIEF DESCRIPTION OF THE DRAWINGS

The invention will now be described in detail with reference to the accompanying drawings wherein.

DETAILED DESCRIPTION OF A PREFERRED EMBODIMENT

Figure 1:
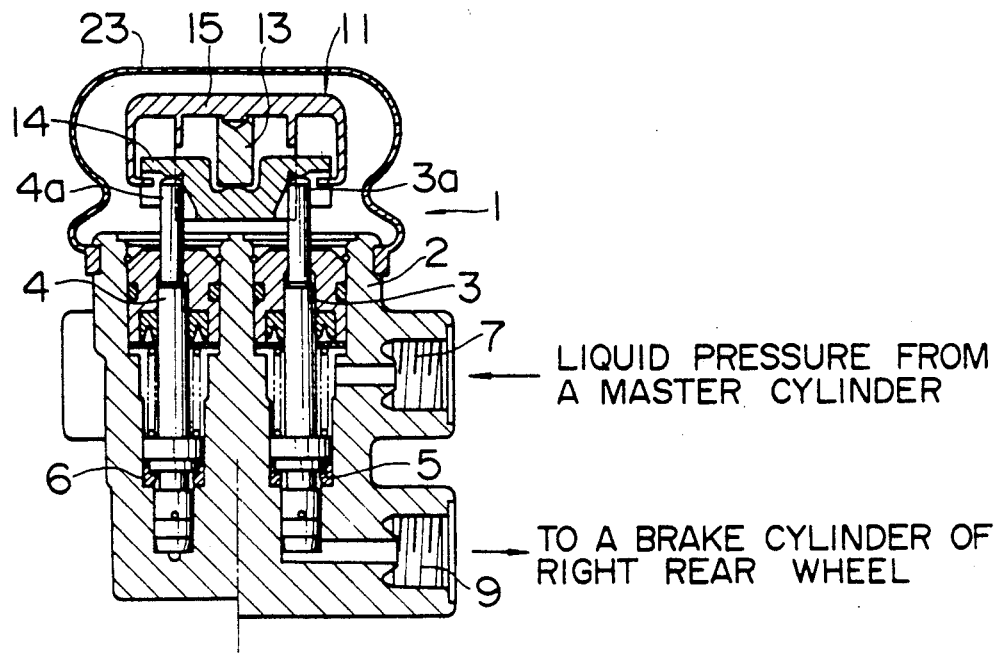
FIG. 1 is a cross sectional view showing an embodiment of a liquid pressure control device for load responding brakes according to the present invention.

A preferred embodiment of the present invention will be described in detail hereinafter with reference to the drawings.

In the figures, in a liquid pressure control device 1 for a load responding brake fixed generally on the chassis of a vehicle such as an automobile, a pair of plungers 3 and 4 moved independently by liquid pressure from a brake master cylinder are disposed slidably and sealingly in a housing 2, and respective control valves 5 and 6 formed in the housing 2 are opened and closed by the movement of these plungers 3 and 4. Thus, by opening and closing these control valves 5 and 6, liquid pressure transmitted independently to inlet ports 7 and 8 from the above-mentioned brake master cylinder is reduced in a predetermined ratio, and transmitted to brake cylinders of right and left rear wheels from outlet ports 9 and 10.

Figure 2:
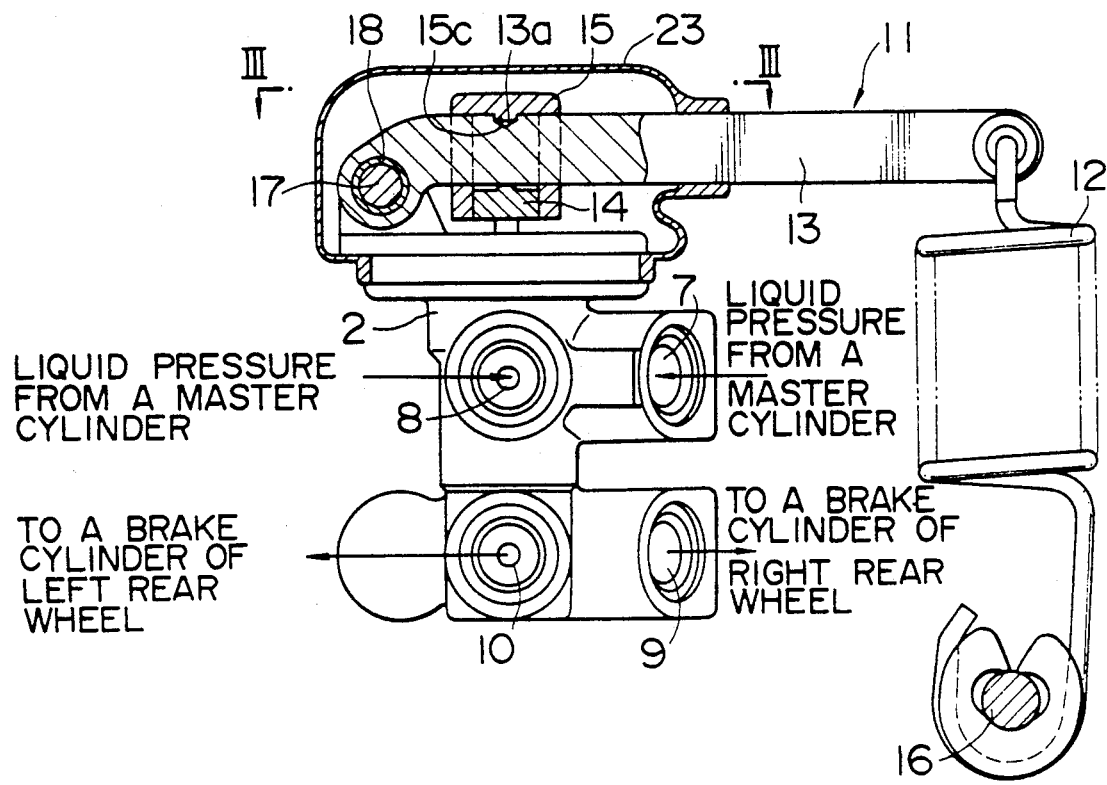
FIG. 2 is a front elevational view partly in cross section of a principal part of FIG. 1.
Figure 3:
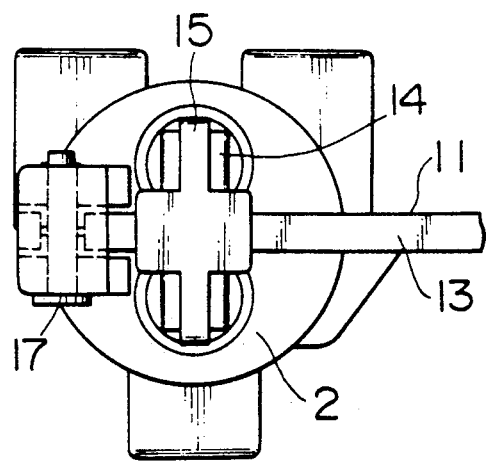
FIG. 3 is plan view taken along a line III—III in FIG. 2 with part omitted for clarity.

A load sensing mechanism 11 is disposed at the upper end of the above-mentioned housing 2 as shown in FIGS. 1 and 2. This load sensing mechanism 11 is composed of a spring 12, a load sensing lever 13, an equalizer 14 and a clamp 15.

The above-mentioned spring 12 is connected to a member 16 on the rear axle side at one end thereof and connected to one end of the load sensing lever 13 at the other end thereof, and transmits energizing force according to the movable load of the vehicle to the load sensing lever 13.

The other end of the load sensing lever 13 is supported rotatably at one end of the above-mentioned housing 2 through a pin 17 and a bushing 18. The load sensing lever 13 applies the energizing force of the spring 12 to plunger ends 3a and 4a projecting from the plungers 3 and 4 disposed sealingly in the housing 2 through the equalizer 14. Further, a positioning hole 13a for positioning the equalizer 14 at a predetermined position is provided on the top surface of the load sensing lever 13. Then, the pressure reduction starting points of respective control valves 5 and 6 are moved in the above manner.

Figure 4:
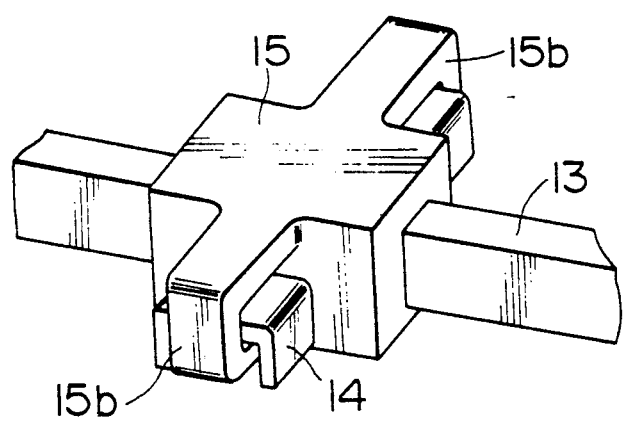
FIG. 4 is a perspective view showing the manner of fitting an equalizer to a load sensing lever according to the invention.
Figure 5:
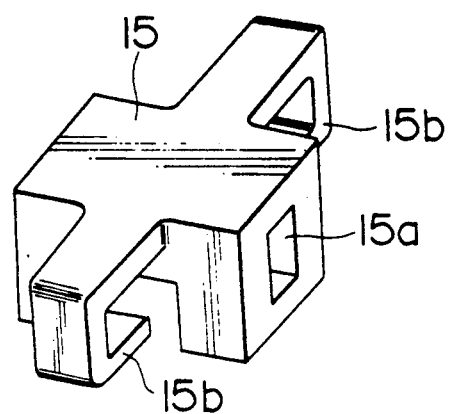
FIG. 5 is a perspective view of a clamp according to the invention

The equalizer 14 is fitted to the load sensing lever 13 by means of the clamp 15 as shown in FIG. 4. Namely, the clamp 15 is provided with a hole 15a at an almost central part thereof through which the load sensing lever 13 passes and with hook-shaped parts 15b for hooking two ends of the equalizer 14 on two ends positioned in a direction perpendicular to the hole 15a as shown in FIG. 5, and a projection 15c for fixing the load sensing lever 13 to the positioning hole 13a is provided at the central part on the top surface of the through hole 15a.

Figure 6:
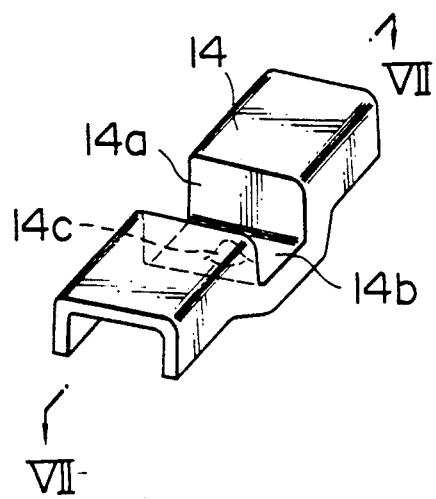
FIG. 6 is a perspective view of an equalizer.
Figure 7:
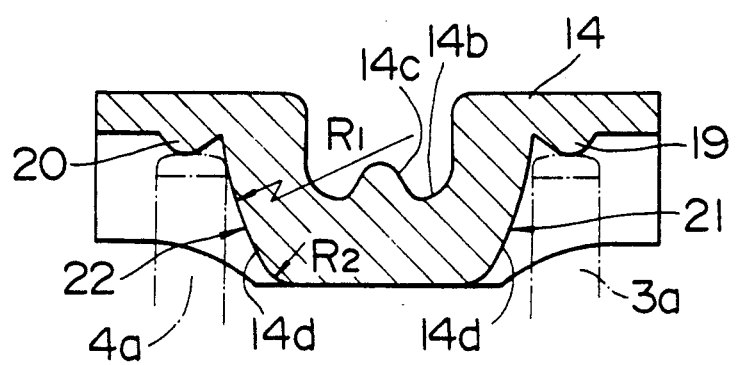
FIG. 7 is a cross sectional view taken along line VII—VII in FIG. 6.

As shown in FIG. 6, the above-mentioned equalizer 14 has a cross section of a U shape at the end portion, and a recessed portion 14a for the load sensing lever 13 to cross at grade is formed at the central portion in the longitudinal direction thereof. A projection 14c to contact at a point with the load sensing lever 13 is provided at bottom 14b. Further, as shown in FIG. 7, projections 19 and 20, which come into contact at a point with the plunger ends 3a and 4a, are provided on a back portion, and also guides 21 and 22 having rounded or tapered surfaces or grooves having these surfaces formed at a plurality of locations for guiding the plunger ends 3a and 4a to the projections 19 and 20 at the time of assembly and adjustment are provided on both back sides 14d of the recessed portion 14a.

In the liquid pressure control device 1, when the equalizer 14 is fitted to the load sensing lever 13, the clamp 15 is fitted to the load sensing lever 13 through the through hole 15a, and the projection 15c of the clamp 15 is fixed to the positioning hole 13a of the load sensing lever 13 after hook end the equalizer 14 by means of the hooking portions 15b.

When the load sensing lever 13, the equalizer 14 and the clamp 15 are assembled and adjusted as described above, the projections 19 and 20 on the back portion of the equalizer 14 always abut correctly against respective ends 3a and 4a of the plungers 3 and 4 through the guides 21 and 22, thus making it possible to have the energizing force of the spring 12 act exactly. Also, a boot 23 is installed on the housing 2 for protecting mechanism portions, such as the plunger ends 3a and 4a and the equalizer 14, from invasion by foreign matter.

The scope of the present invention is not limited to the above-mentioned embodiment, but means having other configurations with similar functions may be adopted, and further it is possible by the art of the present invention to perform various modifications and additions within the scope of the above-described structure.

As it is apparent from the above description, according to a liquid pressure control device for load responding brakes of the present invention, the equalizer constituting the load sensing mechanism thereof is attached fixedly at a predetermined position of the load sensing lever by means of a clamp member, or the equalizer is attached fixedly simply to the load sensing lever by means of one piece of clamp member, and guides for guiding respective plunger ends are provided. Thus, the equalizer is fitted with a minimum number of parts at the time of assembly, and the workability thereof including adjustment becomes excellent. At the same time, the equalizer can let respective plungers always abut in a fixed positional relationship against the large movement of the load sensing lever during assembly and adjustment of the present device.

As a result, it is possible to improve the workability of assembly and adjustment of a liquid pressure control device.

I claim:

1. A liquid pressure control device for a load responding brake of a vehicle, including a valve mechanism mounted in a housing for reducing liquid pressure of a brake master cylinder at a predetermined ratio by means of a pair of plungers moved independently by liquid pressure from the brake master cylinder and for transmitting the reduced pressure to brake cylinders of right and left rear wheels, respectively, and a load sensing mechanism acting on said respective plungers for moving a pressure reduction starting point of said valve mechanism in response to a movable load of the vehicle, said load sensing mechanism comprising:

a load sensing lever having a first end pivotally connected to said housing of said valve mechanism and a second end;

a spring having one end thereof connected to an axle side and the other end thereof connected to said second end of said lever for transmitting energizing force according to said movable load of the vehicle;

an equalizer abutting against one end of each of said plungers and having first and second end portions; and a clamp member having a positioning means for said lever and hook-shaped portions engaging said end portions of said equalizer for securing said equalizer at a predetermined position on said load sensing lever.

2. The liquid pressure control device as claimed in claim 1, and further comprising:

abutting positions on said equalizer for engaging said one end of each plunger, respectively; and guides on said equalizer for guiding said one end of each plunger into said abutting positions.

3. The liquid pressure control device as claimed in claim 2, wherein:

said positioning means for said load sensing lever comprises a hole through said clamp member for receiving said lever therein.

4. The liquid pressure control device as claimed in claim 3 wherein:
said equalizer extends in a first direction with respect to said clamp member; and
said hole for positioning said lever extends in a second direction substantially transversely to said first direction.

5. The liquid pressure control device as claimed in claim 4 wherein:
said equalizer has a substantially U-shaped cross section; and
each of said hook-shaped portions of said clamp member has a part thereof extending into one of said end portions of said equalizer between the legs of said U-shaped cross section.

6. The liquid pressure control device as claimed in claim 5 and further comprising:
first and second opposite sides on said clamp member, said hook-shaped portions extending from said first side; and
recess means in said second side of said clamp member for receiving said equalizer.

7. The liquid pressure control device as claimed in claim 6 and further comprising:
recess means in said equalizer for receiving part of said load sensing lever therein.

8. The liquid pressure control device as claimed in claim 7 and further comprising:
interengaging cooperating means on said clamp member and said load sensing lever for positioning said load sensing lever in said hole relative to said clamp member.

9. The liquid pressure control device as claimed in claim 8 wherein:
said cooperating means comprises a recess in one of said clamp member and lever and a projection in the other of said clamp member and lever.

10. The liquid pressure control device as claimed in claim 1, wherein:
said positioning means for said load sensing lever comprises a hole through said clamp member for receiving said lever therein.

11. The liquid pressure control device as claimed in claim 10 wherein:
said equalizer extends in a first direction with respect to said clamp member; and
said hole for positioning said lever extends in a second direction substantially transversely to said first direction.

12. The liquid pressure control device as claimed in claim 10 and further comprising:
interengaging cooperating means on said clamp member and said load sensing lever for positioning said load sensing lever in said hole relative to said clamp member.

13. The liquid pressure control device as claimed in claim 12 wherein:
said cooperating means comprises a recess in one of said clamp member and lever and a projection in the other of said clamp member and lever.

14. The liquid pressure control device as claimed in claim 1 wherein:
said equalizer has a substantially U-shaped cross section; and
each of said hook-shaped portions of said clamp member has a part thereof extending into one of said end portions of said equalizer between the legs of said U-shaped cross section.

15. The liquid pressure control device as claimed in claim 1 and further comprising:
first and second opposite sides on said clamp member, said hook-shaped portions extending from said first side; and
recess means in said second side of said clamp member for receiving said equalizer.

16. The liquid pressure control device as claimed in claim 1 and further comprising:
recess means in said equalizer for receiving part of said load sensing lever therein.

* * * * *